United States Patent
Joudon et al.

(10) Patent No.: US 12,091,986 B2
(45) Date of Patent: Sep. 17, 2024

(54) VANE COMPRISING A STRUCTURE MADE OF COMPOSITE MATERIAL, AND ASSOCIATED MANUFACTURING METHOD

(71) Applicant: Safran Aircraft Engines, Paris (FR)

(72) Inventors: Vincent Joudon, Moissy-Cramayel (FR); Clément Cottet, Moissy-Cramayel (FR); Vivien Mickaël Courtier, Moissy-Cramayel (FR); Régis Eugène Henri Servant, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 18/285,122

(22) PCT Filed: Mar. 24, 2022

(86) PCT No.: PCT/FR2022/050549
§ 371 (c)(1),
(2) Date: Sep. 29, 2023

(87) PCT Pub. No.: WO2022/208002
PCT Pub. Date: Oct. 6, 2022

(65) Prior Publication Data
US 2024/0175363 A1 May 30, 2024

(30) Foreign Application Priority Data
Mar. 30, 2021 (FR) .................................... 2103278

(51) Int. Cl.
*F01D 5/14* (2006.01)
*F01D 5/28* (2006.01)

(52) U.S. Cl.
CPC ............. *F01D 5/147* (2013.01); *F01D 5/141* (2013.01); *F01D 5/282* (2013.01); *F05D 2220/36* (2013.01)

(58) Field of Classification Search
CPC ................................. F01D 5/147; F01D 5/141
See application file for complete search history.

(56) References Cited

U.S. PATENT DOCUMENTS 3,981,616 A * 9/1976 Stargardter ............. F01D 5/147
416/233
4,524,499 A 6/1985 Grimes et al.
(Continued)

FOREIGN PATENT DOCUMENTS

FR 2 954 271 A1 6/2011
FR 2 982 175 A1 1/2012

OTHER PUBLICATIONS

French Preliminary Search Report and Written Opinion for French Application No. 2103278, dated Dec. 23, 2021.
(Continued)

*Primary Examiner* — Michael L Sehn
(74) *Attorney, Agent, or Firm* — Birch, Stewart, Kolasch & Birch, LLP

(57) ABSTRACT

The present invention relates to a vane (7) of a turbine engine, comprising: —a structure which has an aerodynamic profile (20); —a spar (21) comprising a vane root portion (24), a blade portion (25) arranged inside the structure which has an aerodynamic profile (20), and a stilt portion (26), the blade portion (25) comprising a body (27) connected to the vane root portion (24) and two arms extending radially from the body (27); and —a structural reinforcement (31) extending from the vane root portion (24) to the body (27) of the blade portion (25), the structural reinforcement (31) being rigidly connected to the vane root portion (24) and config-
(Continued)

ured to form a force path separate from the stilt portion (26) in the event of failure of the spar (21) within the stilt portion (26).

17 Claims, 7 Drawing Sheets

(56) References Cited

U.S. PATENT DOCUMENTS

| | | | | |
|---|---|---|---|---|
| 7,758,314 | B2* | 7/2010 | Wilson | F01D 5/28 |
| | | | | 416/233 |
| 8,142,163 | B1* | 3/2012 | Davies | F01D 5/187 |
| | | | | 416/225 |
| 9,162,750 | B2 | 10/2015 | Coupe et al. | |
| 9,616,629 | B2 | 4/2017 | Fabre et al. | |

OTHER PUBLICATIONS

International Search Report and Written Opinion of the International Searching Authority for International Application No. PCT/FR2022/050549, dated Jul. 22, 2022.

* cited by examiner

VANE COMPRISING A STRUCTURE MADE OF COMPOSITE MATERIAL, AND ASSOCIATED MANUFACTURING METHOD

TECHNICAL FIELD

The disclosure relates to a blade comprising a structure made of composite material.

The disclosure relates more particularly, but not exclusively, to a blade intended to be used in an unducted fan rotor of an aircraft engine (such as an Open Rotor type engine, that is to say whose fan is not ducted, with two rotating propellers or a USF (Unducted Single Fan) type engine with a blade assembly and a vane assembly or a turboprop with an architecture with a single propeller) or in a wind turbine rotor.

BACKGROUND

The design of the fan blades requires taking into account opposing stresses.

On the one hand, the dimensioning of these blades must allow optimal aerodynamic performance (maximize efficiency and provide thrust while minimizing losses). The improvement in the aerodynamic performance of the fan tends towards an increase in the bypass ratio (BPR), and this results in an increase in the outer diameter, and therefore in the span of these blades.

On the other hand, it is also necessary to guarantee resistance to mechanical stresses that may be exerted on these blades while limiting their acoustic signature.

The advantage of the unducted fan engines is that the diameter of the fan is not limited by the presence of a fairing, so that it is possible to design an engine with a high bypass ratio, and therefore reduced fuel consumption.

Thus, in this type of engine, the fan blades can have a large span.

It was proposed to make these blades made of a metal material. Although the blades made of metal material have good mechanical resistance, they nevertheless have the disadvantage of having a relatively large mass.

In order to reduce this mass, it is desirable to be able to manufacture these blades in composite material.

In addition, these engines generally comprise a mechanism making it possible to modify the pitch angle of the blades in order to adapt the thrust generated by the fan according to the different flight phases.

Furthermore, on the unducted fan architectures, the start-up of the engine is generally feathered with very open pitch angle. Indeed, very open pitch angles allows consuming power through the torque, which ensures machine safety by guaranteeing low fan rpms.

However, with very open pitch angles, the blades undergo a strongly separated turbulent aerodynamic flow, which generates a broadband vibrational excitation. Particularly on wide-chord and large span blades, the bending force is intense, although the engine rpm is not high.

However, the intense aerodynamic forces to which these blades are subjected may damage the blades at the level of their stilt (which connects the root to the airfoil) and/or the hub in the interface area between these blades and the hub of the rotor of the fan.

In the unducted architectures, an intense vibrational excitation can also occur at much higher rotational rpms due to the effects of installation of the engine on the aircraft and to the direction of the infinite upstream flow. Indeed, an unducted engine is under the influence of the ground and the fuselage, which causes a distortion in the power supply to the propeller, in flow speed, depending on the engine azimuths. This causes a vibrational response of the blades, in particular on the first engine orders 1N, 2N and 3N. On the other hand, in the absence of an air inlet sleeve, the direction of the air which flows through the blades is not parallel to the drive axis and forms a side-slip angle therewith. This side-slip angle leads to forces called "1P" forces which cause a vibrational response of the blades on the engine order 1N. Similarly, these 1P forces can also appear during the aircraft's climb or approach phases because the air flows through the airfoils with an angle of incidence.

SUMMARY

One aim of the disclosure is to propose a blade comprising a composite material adapted for use with a variable pitch mechanism and in an environment of the "Open Rotor" type while being capable of withstanding intense aerodynamic forces, under the stress of a limited space requirement and minimum mass.

Another aim of the disclosure is to propose a blade comprising a composite material adapted to be used with a variable pitch mechanism and in an environment of the "Open Rotor" type which is capable of retaining the airfoil in the event of rupture of part of the blade, in particular in the area of the stilt which is highly stressed.

Yet another aim of the disclosure is to propose a blade comprising a composite material adapted to be used with a variable pitch mechanism and in an environment of the "Open Rotor" type which can be made simply and quickly, without requiring a large number of operations.

For this purpose there is proposed, according to a first aspect, a blade of a turbomachine comprising:
  a structure with aerodynamic profile comprising two facing skins, the skins comprising a fibrous reinforcement densified by a matrix;
  a spar comprising a blade root portion configured to be mounted on a hub of a rotor of the turbomachine, an airfoil portion disposed inside the aerodynamic profile structure between the two skins, and a stilt portion extending outside the aerodynamic profile structure between the blade root portion and the airfoil portion,
  the airfoil portion comprising a body connected to the blade root portion and two branches extending radially from the body; and
  a structural reinforcement extending from the blade root portion to the body of the airfoil portion, the structural reinforcement being secured to the blade root portion and configured to form a force path distinct from the stilt portion in the event of rupture of the spar within the stilt portion.

Some preferred but non-limiting characteristics of the blade according to the first aspect are as follows, taken individually or in combination:
  the structural reinforcement comprises a counterplate fixed on the airfoil portion so as to come into contact with the body, opposite to the blade root portion;
  the structural reinforcement comprises at least one rod interference fitted between the blade root portion and the counterplate, preferably two parallel rods;
  the at least one rod is inserted into a through slot opening out onto a radially inner face of the blade root portion;
  the at least one rod is rectilinear;
  the structural reinforcement comprises a shank monolithic with the blade root portion and extending through a passage formed in the stilt portion and where appropriate the body of the airfoil portion;

the counterplate is connected to one end of the shank;

the passage is flared in the stilt portion of the spar so as to arrange an annular space around the shank in the stilt portion;

the spar is metallic; and/or the blade further comprises a filling part including inner cavities, housed in the aerodynamic profile structure between the two branches of the airfoil portion.

According to a second aspect, it is proposed a fan comprising a hub and blades according to the first aspect extending radially from the hub, each blade being rotatably mounted relative to the hub about a respective pitch axis.

According to a third aspect, it is proposed an engine comprising a fan according to the second aspect and an actuation mechanism suitable for being controlled to rotate the blades about pitch axes so as to modify a pitch angle of the blades.

According to a fourth aspect, it is proposed an aircraft comprising a gas turbine engine according to the third aspect.

According to a fifth aspect, it is proposed a method for manufacturing a blade according to the first aspect comprising the following steps:

S1: producing the spar and the structural reinforcement;

S3: producing the fibrous reinforcement of the aerodynamic profile structure, for example by three-dimensional weaving;

S4: inserting the spar into the fibrous reinforcement so that the blade root portion is located outside the first fibrous reinforcement and so that the airfoil portion is located inside the first fibrous reinforcement; and S6: placing the assembly formed by the first fibrous reinforcement and the second fibrous reinforcement in a mold and injecting a matrix into the assembly so as to obtain the blade.

Optionally, prior to step S4, the method further comprises a step of positioning a filling part made of a material including inner cavities between the branches of the airfoil portion of the spar.

DESCRIPTION OF THE FIGURES

Other characteristics, aims and advantages will emerge from the following description, which is purely illustrative and not limiting, and which should be read in relation to the appended drawings in which.

In all the figures, similar elements bear identical references.

DETAILED DESCRIPTION

Figure 1:
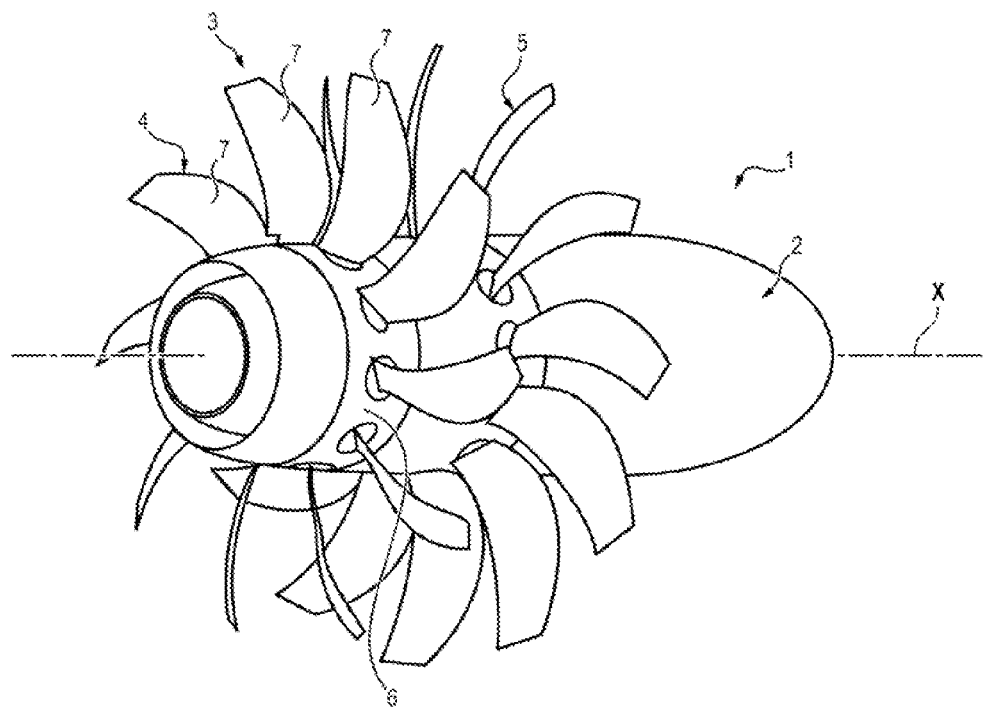
FIG. 1 schematically represents one example of an engine including an unducted fan.
Figure 8:
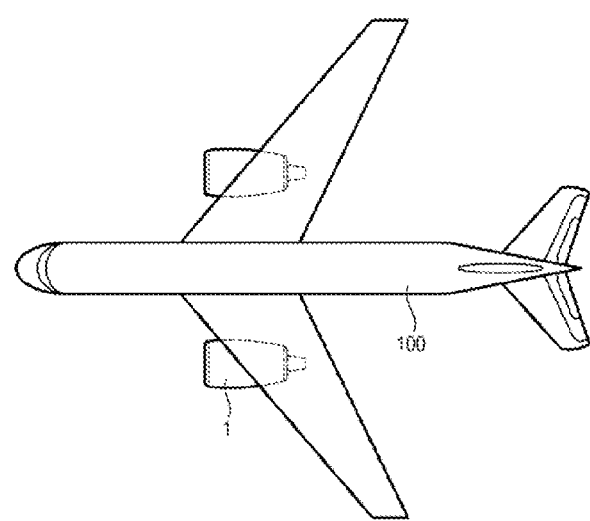
FIG. 8 illustrates one example of an aircraft comprising engines.

In FIG. 1, the engine 1 represented is an "Open Rotor" type engine, in a configuration commonly referred to as "pusher" (i.e. the unducted fan is placed at the rear of the power generator with an air inlet located on the side, to the right in FIG. 1).

The engine 1 comprises a nacelle 2 intended to be fixed to a fuselage of an aircraft 100 and an unducted fan 3 (or propeller). The fan 3 comprises two counter-rotating fan rotors 4 and 5. In other words, when the engine 1 is in operation, the rotors 4 and 5 are driven in rotation relative to the nacelle 2 about the same axis of rotation X (which coincides with a main axis of the engine), in opposite directions.

In the example illustrated in FIG. 1, the engine 1 is an "Open Rotor" type engine in "pusher" configuration with counter-rotating fan rotors. However, the disclosure is not limited to this configuration. The invention also applies to "Open Rotor" type engines in "puller" configuration (i.e. the fan is placed upstream of the power generator with an air inlet located ahead, between or just behind the two fan rotors).

Furthermore, the invention also applies to engines having different architectures, such as an architecture comprising a fan rotor comprising blades and a fan stator comprising vanes, or a single fan rotor.

The invention is applicable to turboprop type architectures (comprising a single fan rotor), as well as to wind turbine rotors.

In the present application, the axis of rotation of the rotor of the fan 4, 5 (or of the propeller) is called axis X. The axial direction corresponds to the direction of the axis X and a radial direction is a direction perpendicular to this axis X and passing therethrough. Each blade 7 is rotatably mounted relative to the hub 6 about a respective pitch axis Y: this pitch axis Y extends in a globally radial direction relative to the axis X. Finally, "inner" (respectively, internal) and "outer" (respectively, external) respectively, are used with reference to a radial direction so that the inner portion or face of an element is closer to the axis X than the outer portion or face of the same element.

The blade 7 will thus be defined relative to the axis X of the rotor on which it is intended to be mounted and its pitch axis Y. By "chord" it will be understood here, for a given section of the blade 7 (and therefore for a given point of the pitch axis Y), the substantially axial line segment which connects the leading edge to the trailing edge of the blade 7.

In FIG. 1, each fan rotor 4, 5 comprises a hub 6 (or blade assembly hub) rotatably mounted relative to the nacelle 2 and a plurality of blades 7 fixed to the hub 6. The blades 7 extend substantially radially relative to the axis of rotation X of the rotor.

Figure 2:
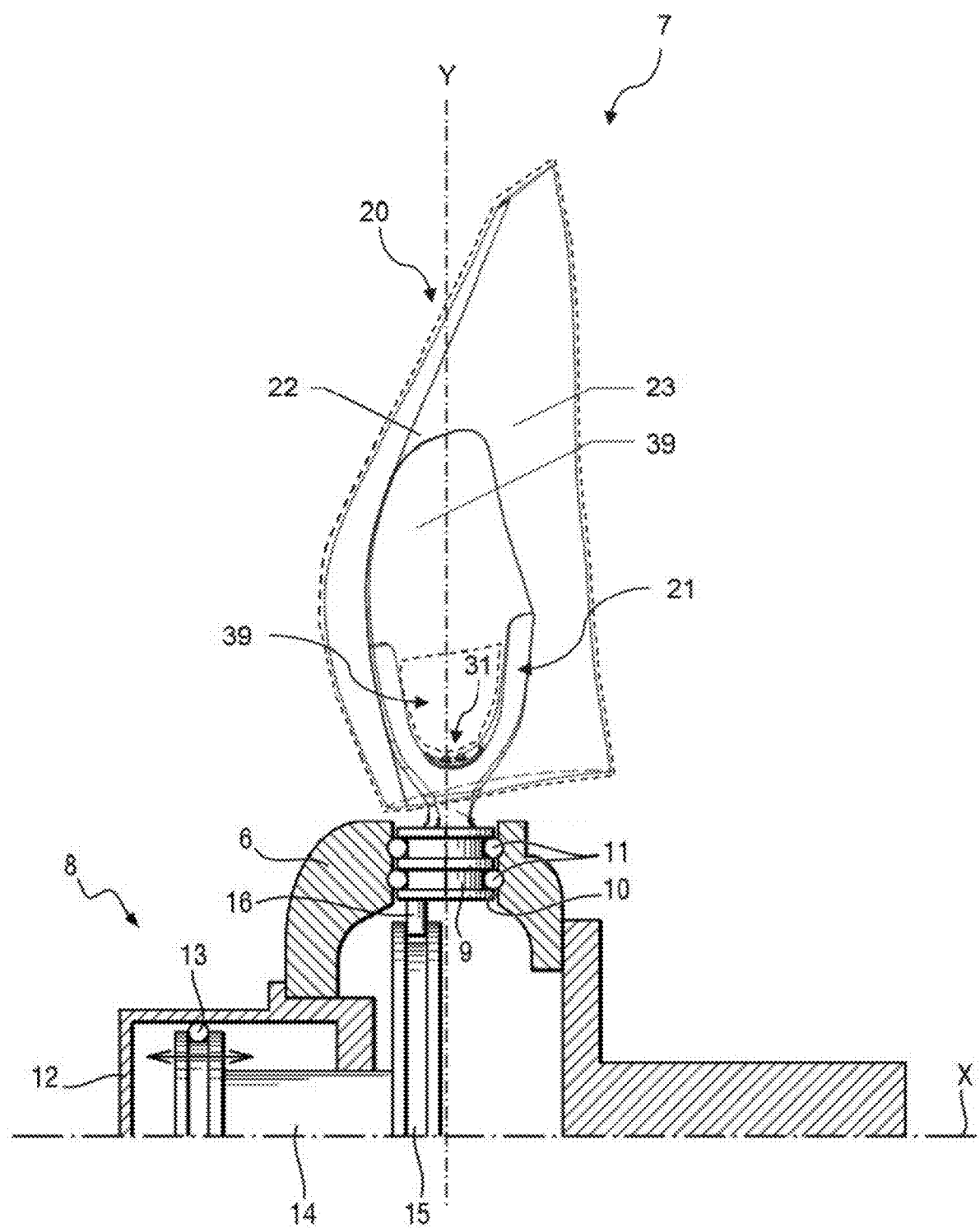
FIG. 2 schematically represents a fan blade and an actuation mechanism making it possible to modify the pitch angle of the blades of the fan, in which the fan blade has been represented in partial cross-section in order to show the spar, a filling part and the structural reinforcement.
Figure 3:
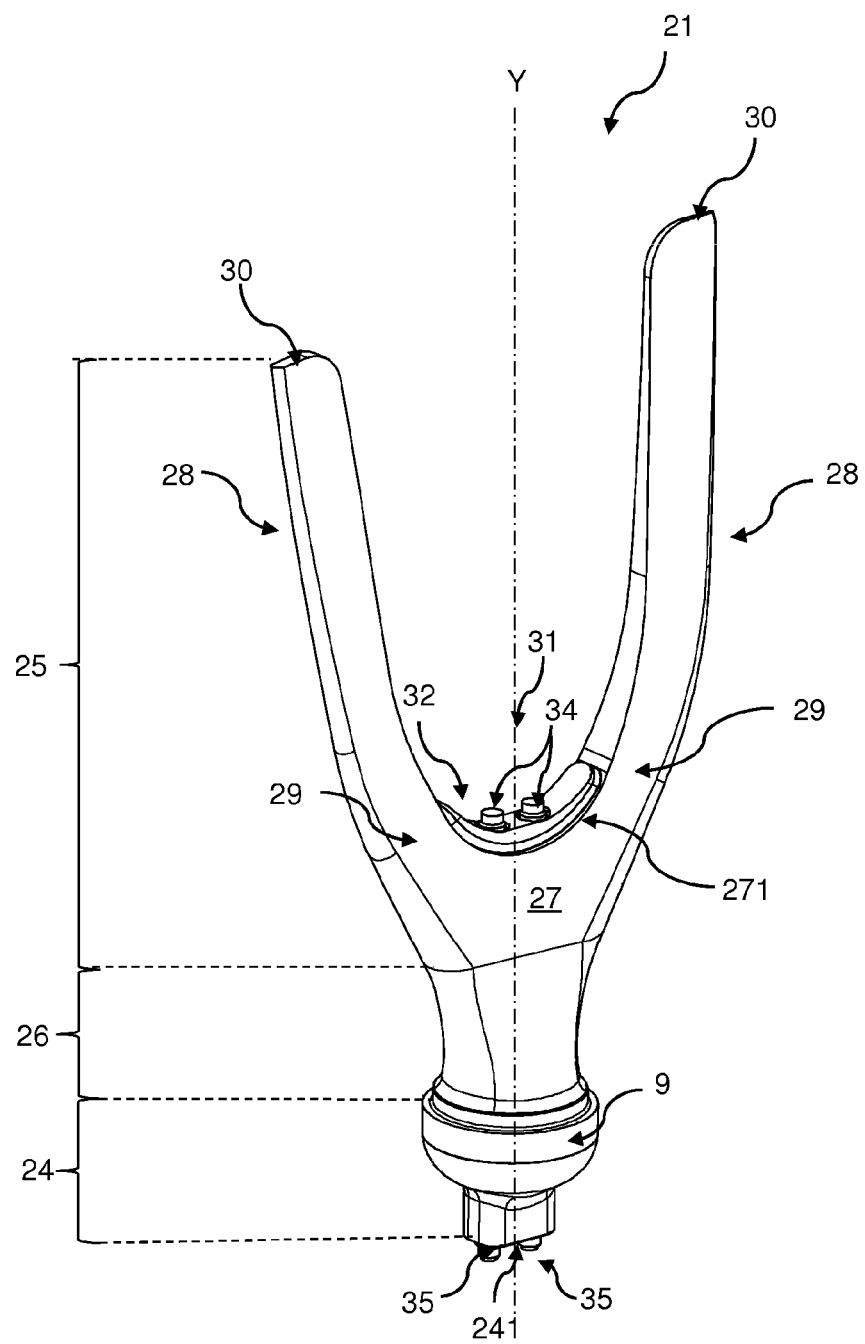
FIG. 3 is an isometric view of a first exemplary embodiment of a spar of a blade.

As illustrated in FIG. 2, the fan 3 further comprises an actuation mechanism 8 making it possible to collectively modify the pitch angle of the blades 7 of the rotors, in order to adapt the performance of the engine to the different flight phases. For this purpose, each blade 7 comprises an attachment part 9 (or blade hub) disposed at the blade root. The attachment part 9 is rotatably mounted relative to the hub 6 about a pitch axis Y. More precisely, the attachment part 9 is rotatably mounted inside a housing 10 arranged in the hub 6, via balls 11 or other rolling elements.

The attachment part 9 comprises a wall having an outer surface with a shape of revolution. The outer surface has two circular grooves suitable for forming rolling paths for balls or other rolling elements.

As a variant, each blade 7 can comprise a cylindrical blade root configured to be connected directly to the hub 6 via bearings.

The actuation mechanism 8 comprises for example an actuator 12 comprising a body 13 fixed to the hub 6 and a rod 14 suitable for being driven in translation relative to the body 12. The actuation mechanism 8 further comprises an annular slide 15 mounted secured to the rod 14 and a pin 16 mounted secured to the attachment part 9. The pin 16 is suitable for sliding in the slide 15 and rotating relative to the slide 15, so as to convert a translational movement of the rod 14 and a rotational movement of the attachment part 9, and consequently a rotational movement of the blade 7 relative to the hub 6 about its pitch axis Y.

The blade 7 comprises an aerodynamic profile structure 20 suitable for being placed in an air stream when the engine 1 is in operation in order to generate a lift, as well as a spar 21.

The aerodynamic profile structure 20 comprises two skins 22, which are connected to each other and extend globally facing each other. The skins 22 are shaped so as to define together an intrados, an extrados, a leading edge and a trailing edge of the blade 7. In a manner known per se, the leading edge is configured to extend facing the flow of gases entering the engine 1. It corresponds to the anterior portion of an aerodynamic profile which faces the air stream and which divides the air flow into an intrados flow and an extrados flow. The trailing edge corresponds to the posterior portion of the aerodynamic profile, where the intrados and extrados flows meet.

The skins 22 of the aerodynamic profile structure 20 are made of a composite material comprising a fibrous reinforcement 23 (see in particular FIG. 2) densified by a matrix. They are therefore monolithic and are made in one piece according to a non-limiting embodiment. As a variant not represented, it is possible to consider a fibrous reinforcement for the intrados and another for the extrados.

The fibrous reinforcement 23 can be formed from a one-piece fibrous preform with evolving thickness. The fibers of the fibrous reinforcement 23 comprise at least one of the following materials: carbon, glass, aramid, polypropylene and/or ceramic. The fibrous reinforcement 23 can comprise woven (two-dimensional or three-dimensional), braided, knitted or laminated fibrous arrangements. The matrix typically comprises an organic matter (thermosetting, thermoplastic or elastomer) or a carbon matrix. For example, the matrix comprises a plastic material, typically a polymer, for example epoxy, bismaleimide or polyimide.

The spar 21 comprises a blade root portion 24 which extends outside the aerodynamic profile structure 20, an airfoil portion 25 which is disposed inside the aerodynamic profile structure 20, between the two skins 22 and a stilt portion 26 which extends between the blade root portion 24 and the airfoil portion 25. The blade root portion 24 is configured to be inserted into the hub 6, where appropriate via an attachment part 9. The stilt portion 26 corresponds to the area of the spar 21 which extends between the outlet of the hub 6 (at the level of the supports) and the aerodynamic structure 20. The airfoil portion 25 forms, with the aerodynamic profile structure 20, the airfoil of the blade 7.

The spar 21 can be made of metal and in one piece: the blade root portion 24, the airfoil portion 25 and the stilt portion 26 are therefore monolithic. The metal material of the spar 21 can comprise one at least of the following materials: steel, titanium, a titanium alloy (particularly TA6V, comprising titanium, aluminum, vanadium and traces of carbon, iron, oxygen and nitrogen), a nickel-based super-alloy such as Inconel, an aluminum alloy. The manufacture of the metal spar 21 can involve several specific methods such as machining, forging, forming, foundry or additive manufacturing (3D printing).

As a variant, the spar 21 can comprise a composite material comprising a fibrous reinforcement densified by a matrix. Analogously to the aerodynamic profile structure 20, the matrix of the spar 21 typically comprises an organic (thermosetting, thermoplastic or elastomer) material or a carbon matrix. For example, the matrix comprises a plastic material, typically a polymer, for example epoxy, bismaleimide or polyimide. The fibers of the fibrous reinforcement of the spar comprise at least one of the following materials: carbon, glass, aramid, polypropylene and/or ceramic. The fibrous reinforcement 23 can comprise woven (two-dimensional or three-dimensional), braided, knitted or laminated fibrous arrangements. The matrix of the spar 21 and the matrix of the aerodynamic profile structure can, where appropriate, be identical. The fibers of the fibrous reinforcement of the spar 21 can be made of a material identical to or different from the fibers of the fibrous reinforcement 23.

In order to resist intense aerodynamic forces, the airfoil portion 25 of the spar 21 comprises a main body 27 connected to the blade root portion 24 and two branches 28 extending radially from the body 27. The body 27 and the branches 28 of the airfoil portion 25 together form the core of the blade 7.

The branches 28 extend radially from a top of the body 27 gradually away from the pitch axis Y. The branches 28 therefore diverge slightly from their radially inner end 29, which is fixed on the body 27, in the direction of their free end 30. The distance between the free ends 30 of the branches 28 is therefore greater than the distance between their radially inner ends 29. For example, the maximum distance between the free ends 30 of the branches 28 can be comprised between 50% and 80% of the maximum chord of the blade 7 while the maximum distance between the inner radial ends 29 (measured at the level of the counterplate described below) can be comprised between 20% and 50% of the maximum chord.

From a mechanical point of view, the two branches 28 of the spar 21 make it possible to increase the tensile stiffness of the structure of the blade 7 while maintaining a reduced mass. Another advantage of this geometry of the spar 21, whose branches 28 extend radially and in the direction of the chord, is to retain the skins 22 of the aerodynamic profile structure 20 by section restriction. Indeed, under the effect of the centrifugal forces oriented in the radial direction, the skins 22 are pressed on the inclined surfaces of the branches 28. The retention of the skins 22 is therefore not only ensured by the strength of a "weak" interface such as an adhesive or resin interface which ensures cohesion between two substrates.

In one embodiment, a width (dimension along the chord of the blade 7 for a given height) of each branch 28 is substantially constant, within 10%, between their radially inner end 29 and their free end 30. Their thickness (dimension along an axis normal to the chord for a given height) decreases from their radially inner end 29 in the direction of their free end 30.

Figure 4:
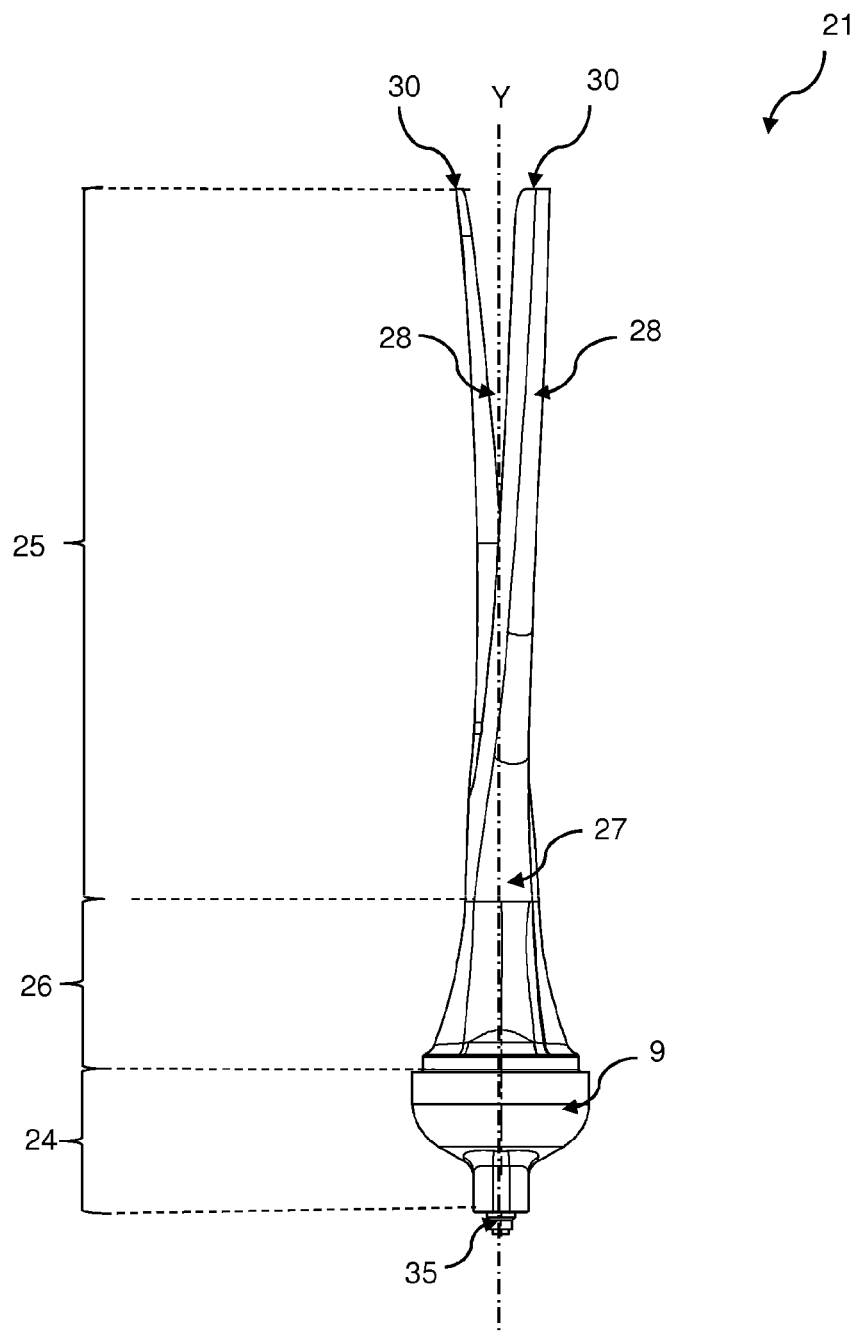
FIG. 4 is a side view of the spar of FIG. 3.
Figure 5:
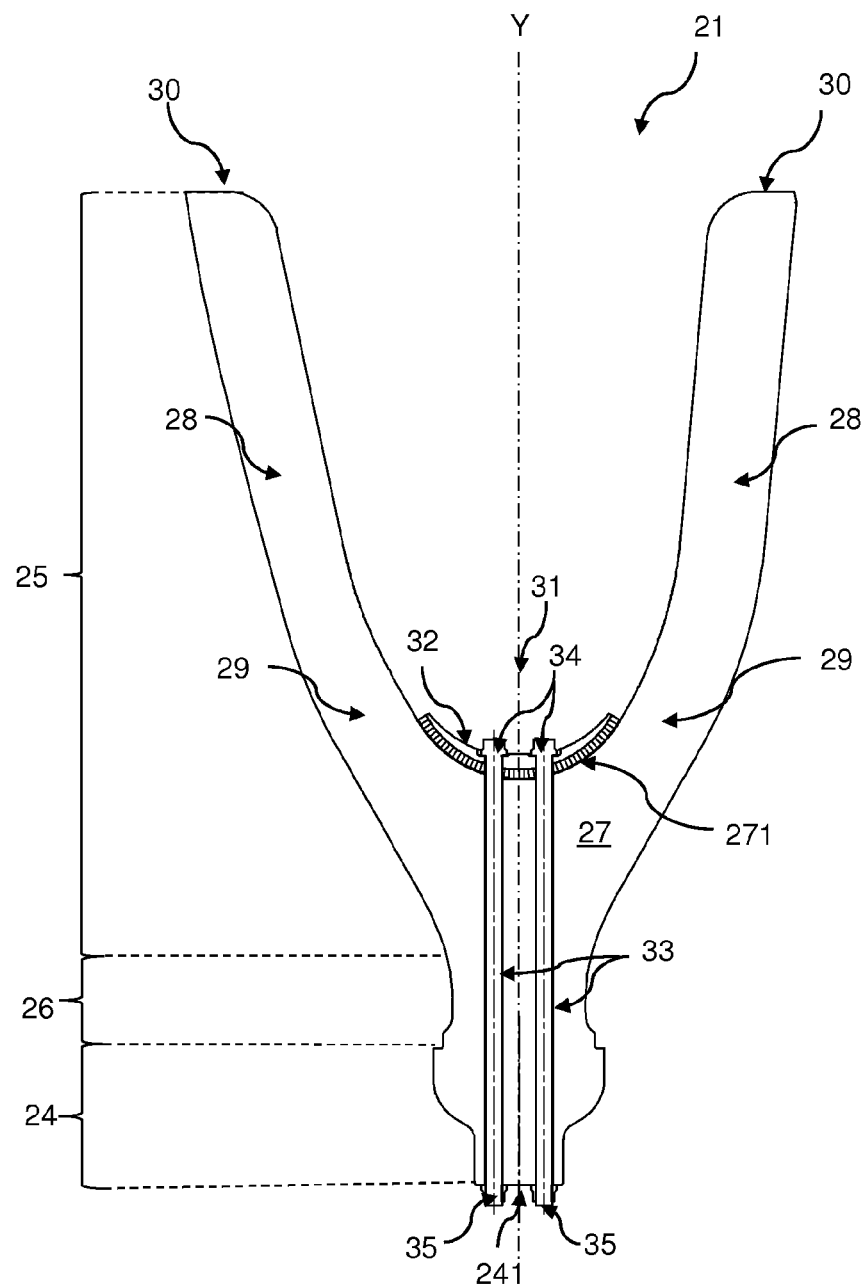
FIG. 5 is a sectional view of the spar of FIG. 3, along a plane passing through the pitch axis Y and the branches of the spar.

The geometry of the branches 28 is chosen so as to follow the geometry of the skins 22 and therefore of the blade 7. In other words, when the blade 7 is twisted, the branches 28 can also be twisted so as to follow the geometry of the blade 7 (see for example FIG. 4). The two branches 28 therefore do not necessarily extend in the same plane and preferably follow the camber of the blade 7.

A height (dimension along the pitch axis Y) of the airfoil portion 25 of the spar 21 can be comprised between 20% and 75% of the height of the aerodynamic structure, for example of the order of 35%.

Optionally, the spar 21 can comprise a greater number of branches 28. The additional branches 28 then extend radially from the body 27.

When the spar 21 comprises a composite material, the conformation of the spar 21 is adapted to the type of material used. Particularly, the branches 28 can be more extended in the direction of the chord of the blade 7 than in the case of a metal spar 21. Moreover, several fibrous reinforcements could be used to produce the spar 21, avoiding machining, and the working section of the spar 21 would be larger than in the case of a metal spar 21.

The blade root portion 24 may have a bulb shape, that is to say a general bulged or curved shape, this bulge or curvature extending about the pitch axis Y. If a median plane passing through the bulb which is normal to the pitch axis Y and which passes through its largest cross section is defined, the bulb of the blade root portion 24 can for example have a globally circular section.

The spar 21 may be hollow. As a variant, only part of the spar 21 may be hollow (for example the branches 28), the rest of the spar 21 may be solid. According to yet another variant, the entire spar 21 is solid.

The blade 7 further comprises a structural reinforcement 31 extending from the blade root portion 24 to the main body 27 of the airfoil portion 25. This structural reinforcement 31 is particularly secured to the blade root portion 24 in order to form a force path distinct from the stilt portion 26 of the spar 21 in the event of rupture of the spar 21 within the stilt portion 26. Thanks to this distinct force path, the structural reinforcement 31 thus makes it possible to retain the airfoil of the blade 7 in the event of rupture of the spar 21 in its stilt portion 26, which is highly stressed. The structural reinforcement 31 makes it possible particularly to reduce the risks incurred in the event of development of one or more cracks/fissures due to fatigue within the stilt portion 26 or during bird ingestion.

The structural reinforcement 31 comprises a counterplate 32 fixed on the airfoil portion 25 so as to come into contact with the body 27, opposite to the blade root portion 24.

Preferably, the counterplate 32 is globally symmetrical relative to the pitch axis Y and is centered on the pitch axis Y. By way of example, the counterplate 32 is pressed against a radially outer face 271 of the body 27, between the inner radial ends 29 of the branches 28 of the airfoil portion 25 of the spar 21.

In a first embodiment, the structural reinforcement 31 comprises at least one rod 34 interference fitted between the blade root portion 24 and the counterplate 32. Preferably, the structural reinforcement 31 comprises two rods 34 mounted in parallel in the spar 21.

In this embodiment, a slot 33 configured to receive a corresponding rod 34 of the structural reinforcement 31 is made in the spar 21. Each slot 33 extends globally along the pitch axis Y. In the case where the structural reinforcement 31 comprises two slots 33, the slots 33 extend symmetrically on either side of the pitch axis Y. Each slot 33 moreover extends from the blade root portion 24 to the core of the airfoil portion 25 and opens out both on a radially inner face 241 of the blade root portion 24 (which corresponds to the face which is against a bottom of the attachment 9 or of the hub 6) and on the radially outer face 271 of the body 27, facing the counterplate 32. The slots 33 are therefore through slots.

The rods 34 and the slots 33 are preferably rectilinear in order to facilitate the manufacture and assembly of the blade 7. The slots 33 can for example be made by drilling the spar 21, since the latter is metallic.

The rods 34 can each comprise a screw 34 which can be fixed on the counterplate 31 using a nut 35.

In order to form an alternative force path in the event of rupture of the stilt portion 26 of the spar 21, the counterplate 32 comprises two through orifices to each receive a rod 34 and is applied against the radially outer face 271 of the body 27 so as to place each through orifice facing the outlet of a corresponding slot 33. Each screw 34 is then inserted into one of the through orifices and into the corresponding slot 33 so that the head of each screw 34 bears against the counterplate 32. The free end of each screw 34 then protrudes from the corresponding slot 33. A nut 35 is then screwed onto the free end of each screw 34 and is tightened so as to pre-stress the counterplate 32 by applying thereto a pressure in the direction of the body 27 (without however crushing it). Thus, in the event of rupture of the stilt portion 26, the forces passing through the rods 34 (which extend radially relative to the rotor) increase considerably under the effect of the centrifugal forces, which has the effect of crushing the counterplate 32 against the body 27 and therefore of slightly moving the airfoil radially inwards.

The airfoil is thus retained while generating an unbalance (mechanical and/or aerodynamic unbalance) which is detectable by a system for monitoring the motor behavior.

Of course, the screws 34 and nuts 35 could be mounted in the other direction, the head of the screws 34 then being in contact with the radially internal face 241 of the blade root portion 24 while their free end is fixed on the counterplate 32 by the nuts 35.

In this embodiment, the counterplate 32 can comprise a compressible material. The counterplate 32 can be made from an elastomer. As a variant, the counterplate 32 can comprise an organic honeycomb, such as a Nomex® type honeycomb (comprising aramid fibers calendered into sheets and covered with phenolic resin), or a honeycomb comprising the one of the following materials: poly(p-phenylene terephthalamide) (Kevlar type), glass fibers, aluminum. According to yet another variant, the counterplate 32 is made of metal, for example from the same material as the spar 21.

Figure 6:
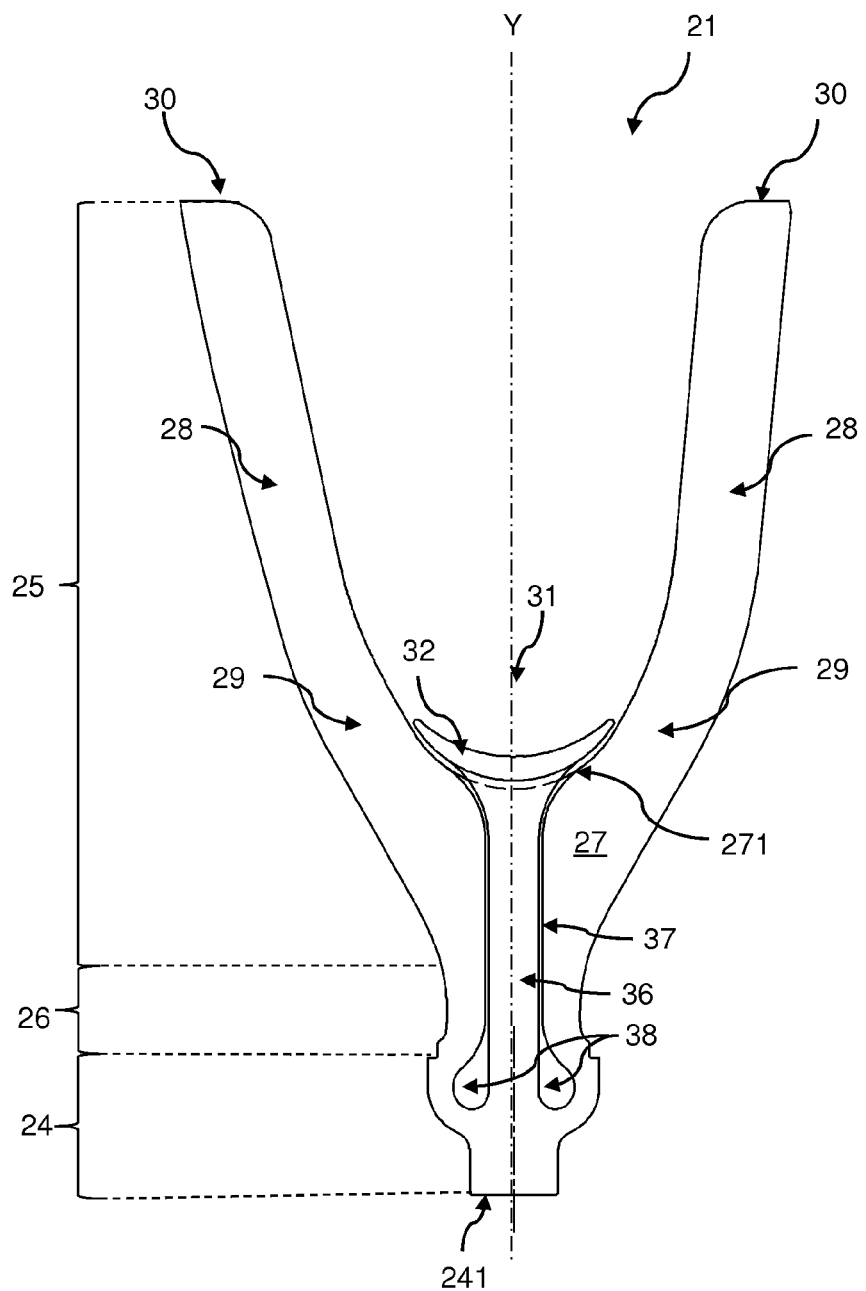
FIG. 6 is a sectional view of a second exemplary embodiment of a spar of a blade.
Figure 7:
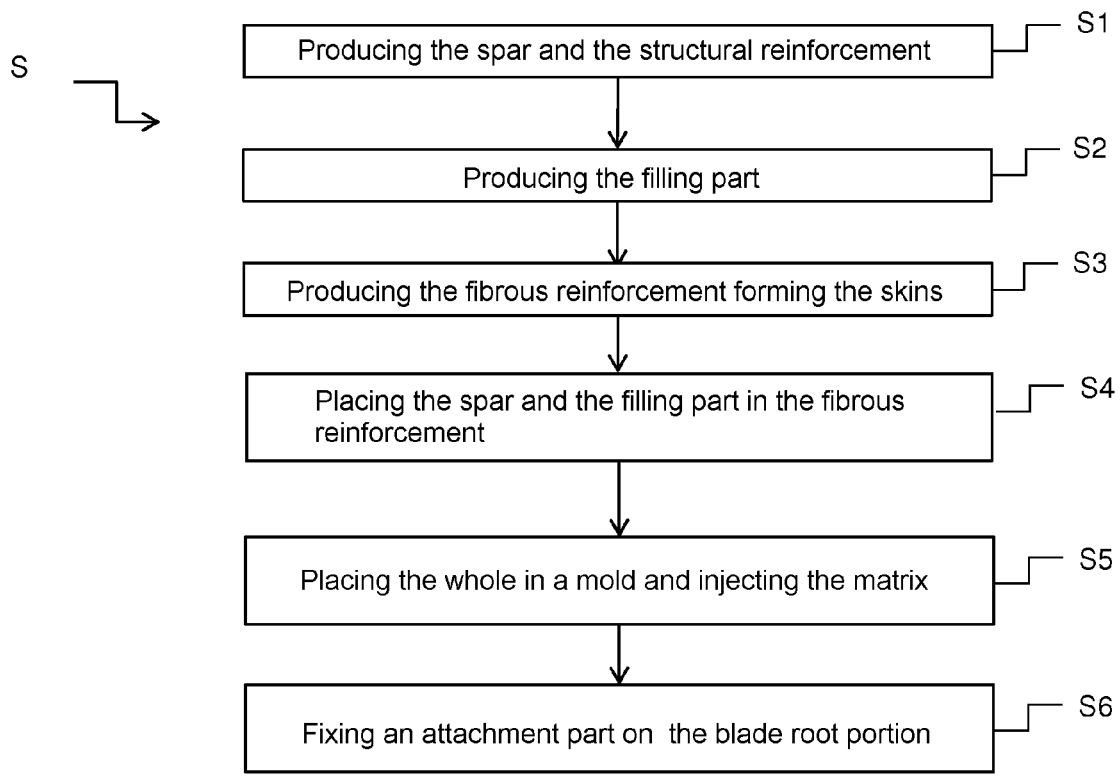
FIG. 7 is a flowchart illustrating the steps of a method for manufacturing a blade in accordance with one embodiment.

In a second embodiment illustrated by way of example in FIG. 6, the structural reinforcement 31 is monolithic with the spar 21. For this purpose, the structural reinforcement 31 comprises a shank 36 monolithic with the blade root portion 24 and extending along the pitch axis Y through a passage 37 formed in the stilt portion 26 and, optionally, in the body 27 of the airfoil portion 25. Preferably, the shank 36 also extends through the body 27.

The shank 36 thus forms a segment of the stilt portion 26 and of the body portion 27. It is monolithic with the blade root portion 24. On the other hand, it is separate and distinct from the rest of the portion stilt 26 and the airfoil portion 25 of the spar 21. The shank 36 also protrudes from the radially outer face 271 of the body 27, the counterplate 32 being connected to a free end of the shank 36.

The shank 36 and the counterplate 32 can be monolithic. As a variant, the counterplate 32 can be added and fixed onto the shank 36, for example by welding or using fixing members such as screws 34.

Insofar as this embodiment does not require the application of a pre-stress on the counterplate 32, the latter can be made of the same material as the spar 21 (and the shank 36).

The monolithic spar 21 with the shank 36 and where appropriate the counterplate 32 can in particular be obtained by 3D printing. Where appropriate, a layer made of compressible material can be fixed on the radially inner face of the counterplate 32 and/or the radially outer face 271 of the body 27 in order to cushion the impact of the counterplate 32 against the body 27 of the spar 21 at the time of activation of the secondary force path (that is to say in the event of rupture of the stilt portion 26). The layer made of compressible material can, where appropriate, also be made by 3D printing and be monolithic with the counterplate 32 and/or the body 27. For example, the layer made of compressible material can comprise a foam of organic origin (polyethacrylimide, polyethylene terephthalate (PET), polyvinyl chloride (PVC), polyetherimide (PEI), polyvinyl, carbon, polyisocyanurate, polyurethane, etc.) or metallic origin (in particular made of aluminum alloy), or a honeycomb of the type Nomex®, made of Kevlar, fiberglass or aluminum.

Optionally, the passage 37 can be flared in the stilt portion 26 of the spar 21 so as to arrange a space 38 around the shank 36. The space 38 can in particular have an annular shape of globally circular section in the vicinity of the blade root portion 24, the section (in a plane normal to the pitch axis Y) of the space 38 then decreasing in the direction of the body 27. The space 38 can be empty or, as a variant, be in whole or in part filled with a filling part which can comprise inner cavities.

A section (in a plane normal to the pitch axis Y) of the shank 36 is substantially constant in the stilt portion 26 and in the body 27, then gradually flares out in the vicinity of the counterplate 32.

It will be noted that, whatever the embodiment of the structural reinforcement 31, the shape of the blade root portion 24 of the spar 21 is unchanged. In other words, the passage 37 may be formed only in the stilt portion 26 and in the body portion 27 of the spar 21. Moreover, the external shape of the stilt portion 26 and of the airfoil portion 25 of the spar 21 may be identical regardless of the embodiment of the structural reinforcement 31. On the other hand, in the case where the structural reinforcement 31 is monolithic with the blade root portion 24, the body 27 of the airfoil portion 25 is into three portions (see in particular FIG. 6). A first portion of the body 27 is formed by the shank 36 of the structural reinforcement 31. The second and third portions correspond to the rest of the body 27 and extend around the shank 36.

These second portions then each extend in the extension of an associated branch 28: they can therefore be separated all along the shank 36 and only be connected together at the level of the root portion of the spar 21 (see FIG. 6).

Optionally, the blade 7 further comprises a filling part 39 placed between the two skins 22 of the aerodynamic profile structure 20, between the two branches 28 and the radially outer face 271 of the body 27 of the airfoil portion 25 of the spar 21. The filling part 39 serves as a bearing for the skins 22 of the aerodynamic profile structure 20.

The filling part 39 can be made of a material including inner cavities, such as a foam of organic origin (polyethacrylimide, polyethylene terephthalate (PET), polyvinyl chloride (PVC), polyetherimide (PEI), polyvinyl, carbon, polyisocyanurate, polyurethane, etc.) or metallic origin (in particular made of aluminum alloy), or a honeycomb of the type Nomex®, made of Kevlar, fiberglass or aluminum.

Example of a Manufacturing Method

A blade 7 can be obtained in accordance with the following steps.

During a step S1, the spar 21 and the structural reinforcement 31 are manufactured.

Any conventional method can be used here, including machining, forging, forming, foundry or additive manufacturing (3D printing) for the production of the spar 21.

When the structural reinforcement 31 comprises rods 34, the slot(s) 33 is (are) made in the spar 21, for example by machining. The counterplate 32, machined previously, is applied on the radially outer face 271 of the body 27, then a rod 34, typically a screw 34, is inserted into each orifice and each associated slot 33. A nut 35 is then screwed onto the free end of each rod 34 so as to block the rod(s) 34 and the counterplate 32 relative to the spar 21 and to pre-stress the counterplate 32.

As a variant, when the spar 21 is obtained by 3D printing, the structural reinforcement 31 can be produced simultaneously with the manufacture of the spar 21. The structural reinforcement 31 and the spar 21 are then obtained by 3D printing and are monolithic.

When the spar 21 comprises a composite material, the fibrous reinforcement can be produced by three-dimensional weaving on a jacquard type loom. During the weaving, bundles of warp strands (or warp strands) are disposed in several layers. Weft strands T are interlaced with the warp strands C so as to link the different layers of warp strands C together. The three-dimensional weaving may be a weaving with "interlock" weave. By "interlock", it is meant a weave in which each layer of weft strands interlinks several layers of warp strands with all the strands of the same weft column having the same movement in the weave plane. The branches 28 can be for example obtained by making a non-interlinking at the level of the radially outer face 271 of the body 27.

Other types of known three-dimensional weaving can be used, such as in particular those described in document WO 2006/136755.

During a step S2, a filling part 39 is produced and placed between the two branches 28 of the spar 21 and placed bearing against the airfoil portion 25 of the spar 21. Where appropriate, an adhesive film can be applied at the interface between the filling part 39 and the spar 21.

The filling part 39 can be produced by injection of foam between the branches 28 of the spar 21 or by adding and fixing a previously machined filling part 39.

As a variant, when the spar 21 is obtained by 3D printing, the filling part 39 can be obtained simultaneously with step S1 by 3D printing (particularly when it is metallic). In this variant, the filling part 39, the structural reinforcement 31 and the spar 21 can then be monolithic.

During a step S3, the fibrous reinforcement 23 of the aerodynamic profile structure 20 is produced. The fibrous reinforcement 23 can be produced by three-dimensional weaving on a jacquard type loom. During the weaving, bundles of warp strands (or warp strands) are disposed in several layers. Weft strands T are interlaced with the warp strands C so as to interlink the different layers of warp strands C together. The three-dimensional weaving can be a weaving with "interlock" weave. By "interlock", it is meant a weave in which each layer of weft strands interlinks several layers of warp strands with all the strands of the same weft column having the same movement in the weave plane.

Other types of known three-dimensional weaving can be used, such as in particular those described in document WO 2006/136755.

In order to allow the insertion (step S4) of the spar 21 into the aerodynamic profile structure 20, a non-interlinking is made in the fibrous reinforcement 23. The non-interlinking can be made at the head (opposite to the blade root 7), at the level of the leading edge or trailing edge of the blade 7. The non-interlinked area is obtained by not connecting the warp strands of two successive layers in two distinct locations and separated by the weft strands.

The fibrous reinforcement 23 is then shaped (three-dimensional deformation in order to give it a twisted shape corresponding to its final shape).

As a variant, the fibrous reinforcement 23 of the aerodynamic profile structure 20 can comprise a two-dimensional woven, braided, knitted or laminated fibrous arrangement. Particularly, the fibrous reinforcement 23 of the skins 22 of the aerodynamic profile structure 20 can comprise a prepreg laminated composite material. In this variant of embodiment, it is then not necessary to make a non-interlinking.

During a step S4, the fibrous reinforcement 23 of the aerodynamic profile structure 20 is placed around the spar 21 and the filling part 39 so that the blade root portion 24 and the stilt portion 26 are located outside the fibrous reinforcement 23 and so that the airfoil portion 25 is located inside the fibrous reinforcement 23.

When the fibrous reinforcement 12 is produced by three-dimensional weaving, the spar 21 and the filling part 39 are advantageously inserted by the non-interlinking of the fibrous reinforcement, typically from above when the non-interlinking is made at the blade head 7.

When the fibrous reinforcement 23 is laminated, the sheets of prepreg composite material can be laminated on the spar 21 and the filling part 39.

During a step S5, the assembly thus obtained, formed of the spar 21, of the fibrous reinforcement 23 of the aerodynamic profile structure 20 and of the filling part 39 is placed in a mold having a cavity with the shape of the final molded part (namely the blade 7) and plastic material (the "matrix" of the aerodynamic profile structure) is injected into the mold so as to impregnate the fibrous reinforcement 23. The injection of plastic material can made by an injection technique of the RTM or VARRTM type. The injected plastic material is for example a thermosetting liquid composition containing an organic precursor of the material of the matrix. The organic precursor is usually in the form of a polymer, such as a resin, optionally diluted in a solvent.

In a manner known per se, the plastic material is heated so as to cause polymerization of the plastic material, for example by crosslinking. For this purpose, the mold is placed in an oven. The part obtained is then demolded and, optionally, trimmed by machining in order to remove excess length and obtain a part with the desired shape, despite a possible retraction of the fibers of the fibrous reinforcement 23 during the polymerization of the plastic material.

During a step S6, an attachment part 9 can where appropriate be added and fixed onto the root of the blade 7, around the blade root portion 24 of the spar 21. It can in particular be obtained by machining in order to form the cavity whose shape and dimensions correspond to those of the blade root portion 24. Optionally, the attachment part 9 can be produced in two portions in order to be able to be added and fixed around the blade root portion 24 thanks to two dedicated rings, for example by shrinking, screwing, welding or by using a clamping collar. The step S6 of fixing the attachment part 9 can therefore be carried out before or after the injection (step S5). Advantageously, the material constituting the attachment part 9 may be different from that of the spar 21.

Conventional operations of end of range of the blade 7 such as rework by machining, the bonding of anti-friction strips, the insertion of a defrosting system or the addition of a metal leading edge and/or trailing edge shield can then be implemented.

The disclosure thus allows the blade 7 to resist the mechanical loads encountered during the flight phases which are likely to excite the vibrational modes of the blade 7. The production of the metal spar 21 also makes it possible to obtain a lift-to-drag ratio of aerodynamic profile at the bottom of the airfoil, making it possible to correctly supply the low-pressure compressor downstream of the fan with a conventional annular air inlet sleeve and avoid the use of an offset sectorial sleeve. In addition, the retention of the skins 22 of the aerodynamic profile structure is ensured not only by the matrix injected into the fibrous reinforcement after insertion of the spar 21, but also by restriction of section around the metal spar 21. From a mechanical point of view, the use of such a metal spar 21 is also advantageous in terms of torsional stiffness relative to its limited mass. From an industrial point of view, the manufacturing, monitoring and assembly operations are considerably reduced in comparison with the use of a spar 21 made of composite materials. Finally, the structural reinforcement 31 allows protection against the consequences of a rupture of the stilt of the blade 7 and makes it possible to warn the pilot of the failure.

The invention claimed is:

1. A blade of a turbomachine comprising:
   a structure with an aerodynamic profile comprising two facing skins, the skins comprising a fibrous reinforcement densified by a matrix; and
   a spar comprising a blade root portion configured to be mounted on a hub of a rotor of the turbomachine, an airfoil portion disposed inside the structure with aerodynamic profile between the two skins, and a stilt portion extending outside the structure with aerodynamic profile between the blade root portion and the airfoil portion, wherein the airfoil portion comprises a body connected to the blade root portion and two branches extending radially from the body; and a structural reinforcement extending from the blade root portion to the body of the airfoil portion, the structural reinforcement being secured to the blade root portion and configured to form a force path distinct from the stilt portion in an event of rupture of the spar within the stilt portion.

2. The blade according to claim 1, wherein the structural reinforcement comprises a counterplate fixed to the airfoil portion opposite to the blade root portion so as to come into contact with the body.

3. The blade according to claim 2, wherein the structural reinforcement comprises at least one rod interference fitted between the blade root portion and the counterplate.

4. The blade according to claim 3, wherein the at least one rod is inserted into a through slot opening out onto a radially inner face of the blade root portion.

5. The blade according to claim 3, wherein the at least one rod is rectilinear.

6. The blade according to claim 2, wherein the counterplate is connected to one end of a shank of the structural reinforcement, the shank being monolithic with the blade root portion and extending through a passage formed in the stilt portion.

7. The blade according to claim 2, wherein the structural reinforcement comprises two rods interference fitted between the blade root portion and the counterplate, wherein the two rods are parallel to each other.

8. The blade according to claim 1, wherein the structural reinforcement comprises a shank monolithic with the blade root portion and extending through a passage formed in the stilt portion.

9. The blade according to claim 8, wherein the passage is flared in the stilt portion of the spar so as to arrange an annular space around the shank in the stilt portion.

10. The blade according to claim 1, wherein the spar is metallic.

11. The blade according to claim 1, further comprising a filling part including inner cavities, wherein the filling part is housed in the structure with an aerodynamic profile between the two branches of the airfoil portion.

12. A fan comprising the hub and blades according to claim 1 extending radially from the hub, each blade being rotatably mounted relative to the hub about a respective pitch axis.

13. A gas turbine engine comprising the fan according to claim 12 and an actuation mechanism suitable for being controlled to rotate the blades about their respective pitch axes so as to modify a pitch angle of the blades.

14. An aircraft comprising at least one gas turbine engine according to claim 13.

15. The blade according to claim 1, wherein the structural reinforcement comprises a shank monolithic with the blade root portion and extending through a passage formed in the stilt portion and the body of the airfoil portion.

16. A method for manufacturing a blade comprising the following steps:
  producing a spar comprising a blade root portion configured to be mounted on a hub of a rotor of a turbomachine, an airfoil portion and a stilt portion, wherein the airfoil portion comprises a body connected to the blade root portion and two branches extending radially from the body;
  producing a structural reinforcement extending from the blade root portion to the body of the airfoil portion, the structural reinforcement being secured to the blade root portion and configured to form a force path distinct from the stilt portion in an event of rupture of the spar within the stilt portion;
  producing a fibrous reinforcement of a structure with an aerodynamic profile;
  inserting the spar into the fibrous reinforcement so that the blade root portion is located outside the fibrous reinforcement and so that the airfoil portion is located inside the fibrous reinforcement; and
  placing the assembly formed by the fibrous reinforcement in a mold and injecting a matrix into the assembly so as to obtain the blade.

17. The method according to claim 16, further comprising positioning a filling part made of a material including inner cavities between the branches of the airfoil portion of the spar prior to placing the assembly in the mold.

* * * * *